US005790962A

United States Patent [19]

Grube et al.

[11] Patent Number: 5,790,962
[45] Date of Patent: Aug. 4, 1998

[54] CONTROL OF AN OPERATING MODE OF A TWO-WAY WIRELESS COMMUNICATION UNIT

[76] Inventors: Gary W. Grube, 561 Chateaux Bourne, Barrington, Ill. 60010; Brian K. Bunkenburg, 3416 N. Racine, Chicago, Ill. 60657; Marc C. Naddell, 2904 Heatherwood Dr., Schaumburg, Ill. 60193

[21] Appl. No.: 455,928

[22] Filed: Aug. 25, 1995

[51] Int. Cl.$^6$ ....................................... H04B 7/26
[52] U.S. Cl. ............................... 455/518; 455/514
[58] Field of Search ........................... 455/33.1, 34.1, 455/34.2, 38.3, 53.1, 54.1, 54.2, 507, 509, 514, 516, 517, 518, 520

[56] References Cited

U.S. PATENT DOCUMENTS

| | | | |
|---|---|---|---|
| 5,313,653 | 5/1994 | Sasuta | 455/54.2 X |
| 5,371,900 | 12/1994 | Bar-On et al. | 455/54.1 X |
| 5,537,684 | 7/1996 | Cassidy et al. | 455/54.2 X |

*Primary Examiner*—Chi H. Pham
*Attorney, Agent, or Firm*—Christopher P. Moreno

[57] ABSTRACT

A template instruction is sent to a communication unit (101), either by a supervisor communication unit (112) or a communication resource controller (108). The template instruction includes a template (205), an enforcement level indication (206), and a supervisor communication unit address (207). The communication unit configures itself to operate in a first mode of operation specified by the template, and attempts to operate the communication unit in a second mode of operation that conflicts with the first mode of operation are detected. Based on the enforcement level specified, a predetermined course of action is effected by the communication unit.

34 Claims, 5 Drawing Sheets

| TRIG. TYPE | TRIG. | SOURCE ADDRESS | TARGET ADDRESS | TEMPLATE | ENFORCE LEVEL | SUPERVISOR ADDRESS |
|---|---|---|---|---|---|---|
| STATUS | AFFIL | 10 | 20 | TG10 | STRICT | 21 |
| STATUS | AFFIL | 11 | 30 | TG11 | MONITOR | 21 |
| STATUS | EMERG | 12 | 31 | TG12 | STRICT | 35 |
| LOCATION | CITY | 13 | 41 | TG13 | MONITOR | 36 |
| TG CALL | TG14 | TG14 | 50 | SITE 1 | RECOMMEND | 51 |
| STATUS | EMERG | TG15 | TG15 | EMERG | STRICT | 57 |
| STATUS | AFFIL | 15 | 15 | DISPATCH | STRICT | 60 |
| STATUS | AFFIL | 16 | 51 | SYSTEM 2 | MONITOR | 65 |
| ... | ... | ... | ... | ... | ... | ... |

*FIG. 2*

CONTROL OF AN OPERATING MODE OF A TWO-WAY WIRELESS COMMUNICATION UNIT

TECHNICAL FIELD OF THE INVENTION

The present invention relates generally to two-way wireless communication systems and in particular to control and maintenance of an operating mode of a two-way wireless communication unit.

BACKGROUND OF THE INVENTION

Two-way wireless communication systems are known to include a plurality of communication units, a limited number of wireless communication resources, and a communication resource controller. Such systems are often used as dispatch-type communication systems.

Dispatch communication systems typically employ digital addressing allowing the plurality of the communication units to be partitioned into talk groups. Talk groups typically organize communication units into groups having a similar function or geographic affiliation. A communication unit initiating a talk group call to other communication units within its talk group will result in a one-to-many wireless communication such that the other members will receive the communication simultaneously. Multiple talk group selections are programmed into the communication units to allow the user to select and operate on one of many possible talk groups at any instant in time particularly in public safety applications, the availability of many possible talk groups can become confusing to users of a communication unit when they must rapidly determine how to adjust the operational controls of their communication unit in response to particular situations, e.g., emergency situations such as shootings, arrests, chases, and rescue operations.

In emergency situations, the need for immediate communications is inhibited in many prior art systems due to the communication system complexity and the operational choices that are available to users of the communication units. Even when a user thoroughly understands how to operate his or her communication unit in any situation, they may not always do so in accordance with the requirements of their supervisor due to forgetfulness or insubordination. This can lead to catastrophic results.

One method for controlling operation of communication units is to rely on a dispatcher or a supervisor to first detect an event requiring assistance and then to broadcast a verbal or text message to all required communication units. Such verbal or textual message often do not include complete operational instructions for each communication unit, thereby requiring a further exchange of messages. As such, this method is prone to adding delay to, and decreasing efficiency of, re-assigning communication units.

Another solution to operational complexity and response time problems is the use of priority monitor, described in U.S. Pat. No. 4, 716, 407 awarded to Borras et al. on Dec. 29, 1987 and entitled TRUNKED COMMUNICATION SYSTEM TRUE PRIORITY CHANNEL SCAN, wherein scanning communication units are directed back to a home talk group in the event that the home talk group becomes active while the communication units are monitoring other system traffic. While the Borras et al. patent teaches a method to automatically "collect" communication units, it only applies to talk group scan and results in communication units grouped together in a common talk group. Once grouped together in the common talk group, Borras et al. does not restrict communication unit users from adjusting the communication unit operational controls in an undesired fashion.

Therefore, a needs exists for a method which allows the operating mode of a two-way wireless communication unit to be controlled remotely without having to send verbal and textual messages. Such a method should be flexible enough to apply to a variety of system services and should provide different levels of control.

BRIEF DESCRIPTION OF THE DRAWINGS

FIG. 2 illustrates a table which can be used by a communication resource controller.

DETAILED DESCRIPTION OF THE PREFERRED EMBODIMENT

Generally, the present invention provides a method for controlling operating modes of two-way wireless communication units. In one embodiment, a two-way wireless communication unit receives a template instruction specifying a first mode of operation. The template instruction may specify a particular communication service, talk group, site, or communication system to which the two-way wireless communication unit is restricted. The two way wireless communication unit is automatically configured to operate in the first mode of operation, and attempts to operate in a second mode of operation are detected.

In another embodiment, a first two-way wireless communication unit, acting as a supervisor, receives a message specifying a first mode of operation. Responsive to the message, the first two-way wireless communication unit automatically transmits a template instruction to a second two-way wireless communication unit and detects attempts to operate the second two-way wireless communication unit in a second mode of operation which conflicts with the first mode of operation. In response to detecting attempts to operate the second two-way wireless communication unit in the second mode of operation, the first two-way wireless communication unit can transmit an approval message to the second two-way wireless communication unit.

In yet another embodiment, at least one operating mode template is provided in a two-way wireless communication system. Upon detection of a predetermined event, a template instruction is automatically transmitted to at least one two-way wireless communication unit. Using the above-described methods, control of operating modes of two-way wireless communication units is achieved without the use of verbal or textual messages. Furthermore, varying levels of control are also provided.

Figure 1:
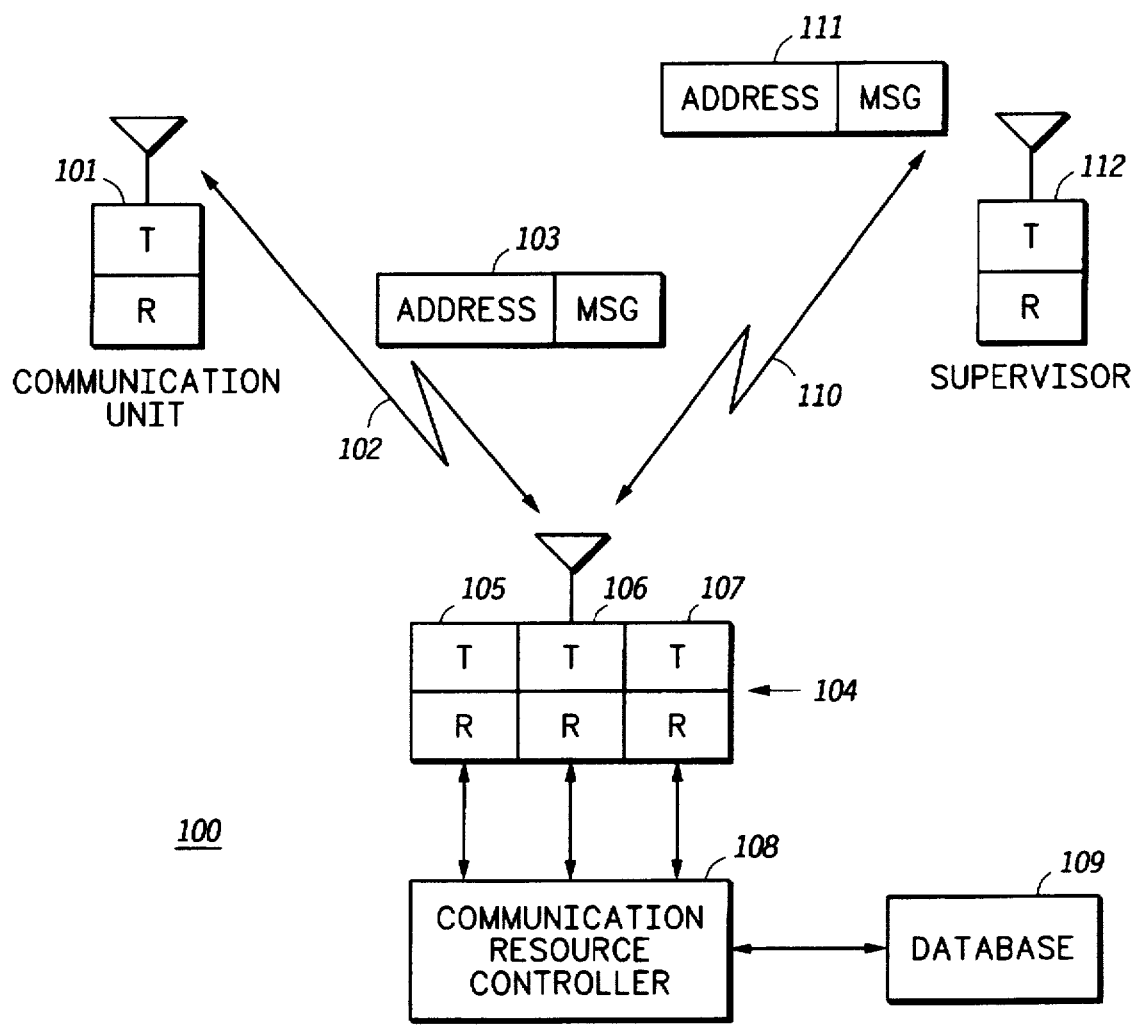
FIG. 1 is a block diagram of a two-way wireless communication system.

The present invention can be more fully described with reference to FIGS. 1–6. FIG. 1 is a block diagram of a two-way wireless communication system 100 that includes two-way wireless communication units 101, 112, a site 104 comprising base stations 105–107, a communication resource controller 108, and a database 109. A larger number of two-way wireless communication units are typically accommodated by the two-way wireless communication system and, for exemplary purposes, a supervisor communication unit 112 is shown. The two-way wireless communication units 101, 112 transceive digitally addressed messages 103, 111 with the base stations 105–107 via wireless communication resources 102, 110. The wireless communication resources 102, 110 may comprise time division multiple access (TDMA), frequency division multiple access (FDMA), or code division multiple access (CDMA) resources, as known in the art.

The two-way wireless communication units 101, 112, which can be "IDEN" portable and mobile radios by Motorola, Inc., transceive voice and/or data messages. A typical message transmission 103, 111 contains an address identifier and a message. The base stations 107–109, which may comprise "IDEN" base station radios by Motorola, Inc., transceive the wireless communication resources 102, 110 that are allocated among the two-way wireless communication units 101, 112 by the communication resource controller 108. Although only one site is shown in FIG. 1, many similar sites could be used in the wireless communication system 100.

The communication controller 108, which can be a "IDEN" Dispatch Application Controller (DAP) by Motorola, Inc., provides the allocation control of the wireless communication resources 102, 110 in response to requests from the two-way wireless communication units 101, 112. Furthermore, as described in greater detail below, the communication resource controller 108 monitors system traffic (e.g., messages 103, 111) for predetermined events. The communication resource controller 108 is operably coupled to the database 109. Information regarding the predetermined events and operating mode templates, as discussed with respect to FIG. 2 below, is stored in the database. The database 109 may comprise random access memory (RAM), read only memory (ROM), magnetic storage media, optical storage media, or any other storage device capable of storing information.

As an example of the operation of the wireless communication system 100, it is assumed that the database 109 includes the information regarding the predetermined events and the operating mode templates. As the communication resource controller 108 allocates resources and monitors the system traffic, it compares system events, as represented by messages 103, 111 sent to and from the two-way wireless communication units 101, 112, with the predetermined events stored in the database 109. If a match is made, i.e., a predetermined event occurs, the communication resource controller 108 transmits a template instruction, in the form of a message 103, to at least one two-way wireless communication unit 101 specified in the database 109.

The template instruction is used to control the operation of the at least one two-way wireless communication unit 101. In order to specify a given level of control, the template instruction includes a template, an enforcement level indication, and a supervisor address. The template specifies a restriction of the at least one two-way wireless communication unit 101 to one or more of the following operating modes: a particular talk group, a particular site, a particular wireless communication system, a particular communication service, or any other restrictive system parameter. In one embodiment, the enforcement level indication is set to either a strict, monitored, or recommend level. Discussion of the various possible enforcement levels is presented in greater detail below. The supervisor address specifies a digital address of a supervisor two-way wireless communication unit 112 associated with the two-way wireless communication unit 101.

FIG. 2 illustrates a table 200 which can be used by the communication resource controller 108. The table 200 is stored in the database 109. As shown, the table contains a trigger type field 201, a trigger field 202, a source address field 203, a target address field 204, a template field 205, an enforcement level field 206, and a supervisor address field 207. Entries 208–215 comprise logically grouped elements from each of the fields 201–207. The table 200 and its contents are predetermined and typically entered by a system manger associated with the communication controller 108.

The table 200 is used by the central resource controller 108 to detect a predetermined event requiring template enforcement. Each predetermined event is specified by the trigger type, trigger, and source address included in any entry 208–215. As messages 103, 111 are transceived, the central resource controller 108 extracts values corresponding to these fields. The central resource controller 108 compares the extracted values with the corresponding fields of each entry 208–215. If a match of all three elements is found in any one entry, a predetermined event has occurred. With the occurrence of a predetermined event, a template instruction is sent. This is best illustrated through use of a detailed example.

Assume that a two-way wireless communication unit having address "10" transmits an affiliation message within the two-way wireless communication system 100. As known in the art, this is a status transaction that provides registration of a communication unit. Thus, in this example, the affiliation of communication unit address "110" matches the "status" entry in the trigger type field 201 for some of the table entries 208–210, and 213–215. Further comparisons with elements in the trigger field 202 and source address field 203 reveal that a predetermined event requiring enforcement of an operational template, i.e., the affiliation of communication unit address "10" corresponding to a first entry 208, has occurred.

Upon detection of the predetermined event used in this example, the communication resource controller 108 formats a template instruction using the elements in the target address field 204, the template field 205, the enforcement level field 206, and the supervisor address field 207 corresponding to the first entry 208. An address portion of the template instruction thus formed contains the target address element from the first entry 208. As shown, the source address and the target address for any entry could refer to the same communication unit, or to different communication units. Additionally, the source and target addresses can identify entire talk groups. In this example, the address portion of the template instruction causes the template instruction to be sent to communication unit address 20. A message portion of the template instruction includes the elements found in the template field 205, enforcement level field 206, and supervisor address field 207 corresponding to the first entry 208.

Elements in the template field 205 specify an operational restriction to one or more of the following operating modes: a particular talk group, a particular site, a particular communication system, a particular communication service, or another restrictive system parameter. In one embodiment, when the template field 205 specifies a particular communication service, the communication unit or units specified in the target address field 204 are restricted to emergency communication services only or to dispatch services only, as known in the art.

Elements in the supervisor address field 207 specify a communication unit address of a supervisor communication unit. When a communication unit, operating under a strict enforcement level and as controlled by its user, attempts to operate in a mode not specified by its template, a detection message is sent to the supervisor communication unit associated with the communication unit. Thus, in the current example, occurrence of the predetermined event defined in the first entry 208 causes a template instruction to be sent to communication unit address "20". The template included in the template instruction restricts the communication unit identified with address "20" to operation only in talk group "10" (TG 10) with a strict enforcement level. Attempts to operate beyond the restriction to talk group "10" will not be allowed automatically and cause a detection message to be sent to a supervisor communication unit having communication unit address "21".

The table 200 illustrates other examples of predetermined events and their associated template information. A second entry 209 is triggered when a communication unit having communication unit address "11" transmits an affiliation status. The resulting template instruction restricts a communication unit having communication unit address "30" to talk group "11" (TG 11) with a monitor enforcement level. Attempts to deviate from the template are allowed and are reported to the supervisor communication unit having address "21".

A third entry 210 is triggered when a communication unit having communication unit address "12" transmits an emergency status. The resulting template instruction restricts a communication unit having communication unit address "31" to talk group "12" (TG 12) with a strict enforcement level. Attempts to deviate from the template are not allowed automatically and are reported to a supervisor communication unit having address "35".

A fourth entry 211 is triggered when a communication unit having communication unit address "13" reports a "city" location designation. Location determination may be carried out using base station site registration, global positioning satellite (GPS) coordinates, proximity to location sign post transmitters, or any other method that produces a desired resolution of location. The resulting template instruction restricts a communication unit having communication unit address "41" to talk group "13" (TG 13) with a monitor enforcement level. Attempts to deviate from the template are allowed and are reported to a supervisor communication unit having address "36".

A fourth entry 212 is triggered when a communication unit affiliated with talk group 14 (TG 14) places a talk group call. The resulting template instruction restricts a communication unit having communication unit address "50" to operation only within the service area of site "1" with a recommend enforcement level. Attempts to deviate from the template are allowed with a local alert provided to a user of the communication unit having address "50". A supervisor communication unit having address "51" is also designated.

A sixth entry 213 is triggered when any communication unit affiliated with talk group "15" (TG 15) transmits an emergency status. The resulting template instruction restricts all communication units affiliated with talk group "15" to emergency communication services only with a strict enforcement level. Attempts to deviate from the template are not allowed automatically and are reported to a supervisor communication unit having address "57".

A seventh entry 214 is triggered when a communication unit having communication unit address "15" transmits an affiliation status. The resulting template instruction restricts that communication unit having address "15" to dispatch services only with a strict enforcement level. Attempts to deviate from the template are not allowed automatically and are reported to a supervisor communication unit having address "60".

Finally, an eighth entry 215 is triggered when a communication unit having communication unit address "16" transmits an affiliation status. The resulting template instruction restricts a communication unit having communication unit address "51" to operation only within the service area of communication system "2" with a monitor enforcement level. Attempts to deviate from the template are allowed and are reported to a supervisor communication unit having address "65". Although eight entries are shown in FIG. 2, any number of entries, up to the limits of the database 109, are possible. Additionally, many different types of predetermined events, other than those shown, can also be defined.

Figure 3:
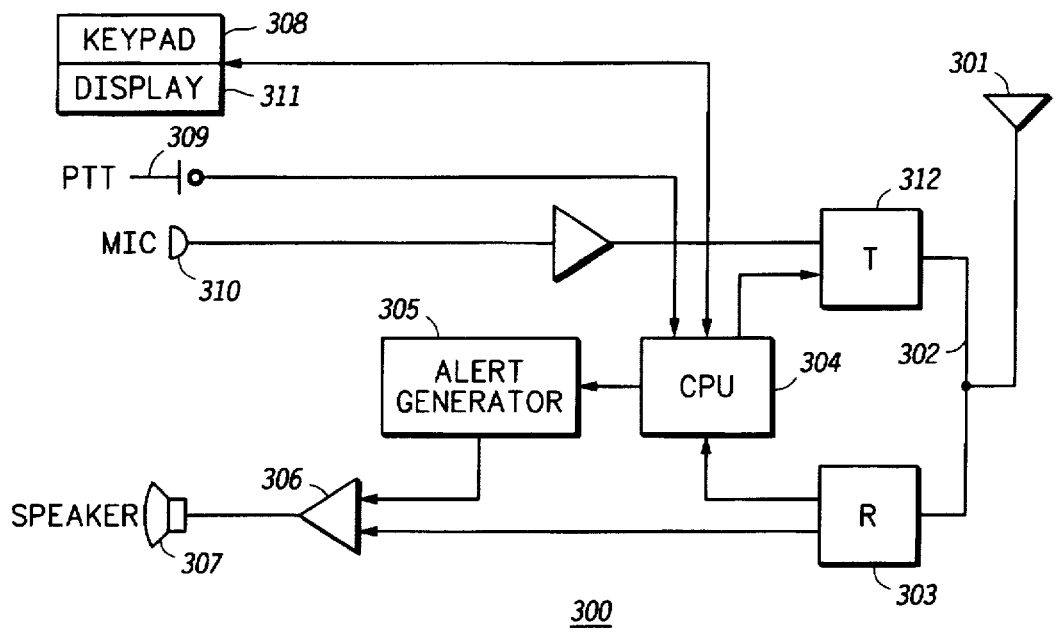
FIG. 3 is a block diagram of a two-way wireless communication unit.

FIG. 3 is a block diagram of a two-way wireless communication unit 300. Such a two-way wireless communication unit could serve as either a supervisor or non supervisor communication unit. As shown, an antenna 301 is employed to transmit and receive wireless signals. Wireless signals are switched between a transmitter 312 and a receiver 303 through an antenna switch 302. The transmitter 312 and receiver 303 are constructed to be compatible with the base stations 105–107 and may comprise TDMA, FDMA, or CDMA technology. The receiver 303 passes demodulated data messages to a central processor unit (CPU) 304 and demodulated voice messages to an audio amplifier 306. The CPU 304 is a microprocessor computing system, such as a 68040 microprocessor system manufactured by Motorola, Inc., equipped with sufficient memory (not shown) to support its own internal operations and to store variables such as a template, an enforcement level indication, and a supervisor address.

The CPU 304 is operably coupled to an alert generator 305 such as a timer integrated circuit or some other circuit capable of generating an audible tone. Audible tone output from the alert generator 305 is coupled to the audio amplifier 306. The audio amplifier 306 sums the speech message output from the receiver 303 with the audible tone output from the alert generator 305 to produce a sufficient power level to drive a speaker 307. Generally an audible power level of 0.5 to 5 watts is sufficient.

A keypad 308 and display 311 provide an input/output interface for the two-way wireless communication unit 300. The keypad 308 may be a numeric-only or a full alphanumeric device capable of capturing keystrokes from a user. Keystroke information is forwarded to the CPU 304 where it is processed. The display 311 may be a liquid crystal display (LCD), cathode ray tube (CRT), or some other type of visual display device. The keypad 308 and display 311 are typically used for the capture and display of text and graphic data messages and for the operation of the two-way wireless communication unit 300. Additionally, a push-to-talk (PTT) switch 309 and a microphone 310, as known in the art, are provided.

When a template instruction intended for the two-way wireless communication unit 300 is received, it is demodulated by the receiver 303 into a data message and forwarded to the CPU 304. The template, enforcement level indication, and supervisor address included in the template instruction are stored by the CPU 304. Once stored, the CPU 304 adapts the operational configuration of the two-way wireless communication unit 300 according to a mode specified in the template. A suitable message commensurate with the new operational mode may be displayed. Until the operating mode is changed by a subsequent template instruction, the CPU 304 monitors operation of the two-way wireless communication unit 300 to ensure that it continues to operate in the specified mode. This operation is described with reference to FIGS. 4 and 5 below.

Figure 4:
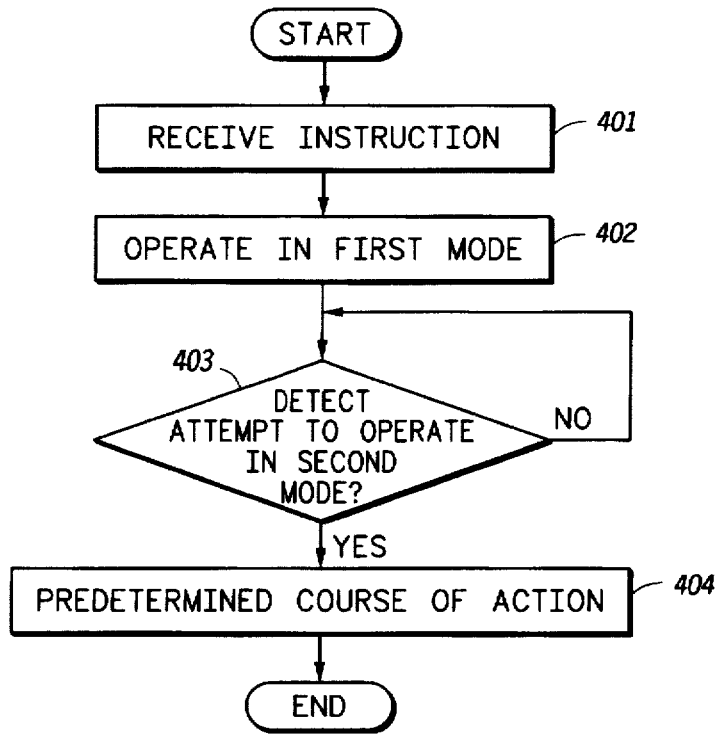
FIG. 4 is a flow chart for use in a two-way wireless communication unit.

FIG. 4 is a flow chart for use in a two-way wireless communication unit. At step 401, a template instruction is received by the communication unit. The address portion of a valid template instruction corresponds to the communication unit's identification (address) and a message portion of the template instruction includes a template, an enforcement level indication, and a supervisor address, as described above.

When a template instruction has been received, the communication unit configures itself, at step 402, to operate in a first mode specified by the template included in the template instruction. The communication unit stores the template, enforcement level, and supervisor address for future reference. As described above, the first mode of operation specified in the template restricts operation of the communication unit.

After configuring itself to operate in the first mode of operation, the communication unit determines, at step 403, whether an attempt to operate the communication unit in a second mode of operation, in conflict with the first mode, has been made. A conflict exists if an operation calls for the communication unit to operate beyond the restrictions imposed by the first mode of operation. This detection is performed by the CPU of the communication unit. For example, if the first mode of operation restricted the communication unit to operate only within talk group "15" and a user of the communication unit attempted to communicate with talk group "14", then a second mode in conflict with the first mode would be detected.

If a conflicting second mode of operation is detected, the communication unit effects a predetermined course of action at step 404. As described in greater detail in FIG. 5, the predetermined course of action can either allow or disallow the second mode of operation and can cause a detection message to be sent to a supervisor communication unit.

Figure 5:
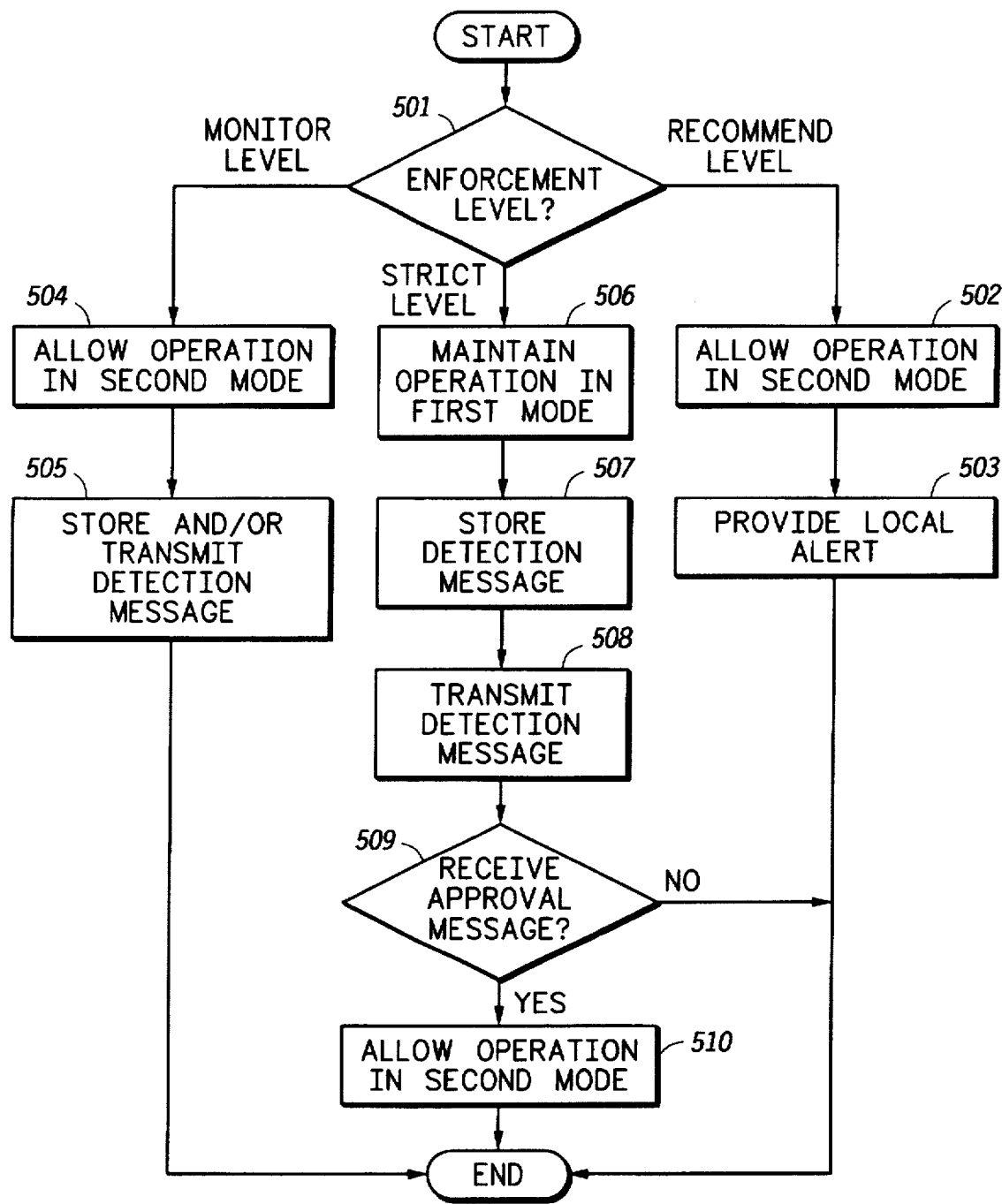
FIG. 5 is a flow chart which illustrates, in greater detail, an embodiment of step 404 from the flow chart of FIG. 4.

FIG. 5 is a flow chart which illustrates, in greater detail, an embodiment of step 404 (i.e., the predetermined course of action) shown in the flow chart of FIG. 4. At step 501, the enforcement level currently imposed on the communication unit is determined. This is done by referring to the enforcement level indication previously received as part of the most recent template instruction.

If the enforcement level is strict, the communication unit maintains operation, at step 506, in the first mode of operation. This maintenance of operation in the first mode makes the strict enforcement level the most rigid with respect to control of the communication unit. At step 507, a detection message can be stored by the communication unit.

The detection message indicates the occurrence of the attempt to operate in the second mode, as well as the operation desired in the second mode, i.e., the proposed mode change. Storage of the detection message is useful for subsequent operational diagnostics.

At step 508, the communication unit transmits the detection message. In addition to the information described above, the transmitted detection message includes the supervisor address and the template received as part of the most recent template instruction, as well as the communication unit's address. The detection message is sent to the supervisor communication unit designated by the supervisor address.

At step 509, the communication unit determines if an approval message has been received from the supervisor communication unit indicated by the supervisor address. The approval message is sent by the supervisor communication unit if the second mode of operation is to be allowed. If an approval message allowing the second mode of operation is received, the communication unit allows operation in the second mode at step 510. After step 510, or if an approval message is not received, then the communication unit maintains operation in either the first or second mode as required.

If, at step 501, it is determined that the communication unit has a monitor enforcement level, operation of the communication unit in the second mode is allowed at step 504. At step 505, a detection message, similar to that described above, is transmitted to the supervisor communication unit designated by the supervisor address. Additionally, the detection message can be stored by the communication unit for subsequent diagnostic purposes. In this manner, the monitor enforcement level provides less control than the strict enforcement level, yet more control that the recommend enforcement level described below.

If, at step 501, it is determined that the communication unit has a recommend enforcement level, operation of the communication unit in the second mode is allowed at step 502. At step 503, the communication unit provides local alert to the user of the communication unit so that the user is made aware of the deviation from the first mode of operation. The local alert may comprise an alert tone or a text message for display. The recommend enforcement level, when compared to the strict and monitored enforcement levels, provides the least amount of control over the communication unit.

Other enforcement levels, either more or less restrictive than those described above, could be used. In providing a variety of enforcement levels, the amount of control over a communication unit or units can be selected to meet the needs of the communication system.

Figure 6:
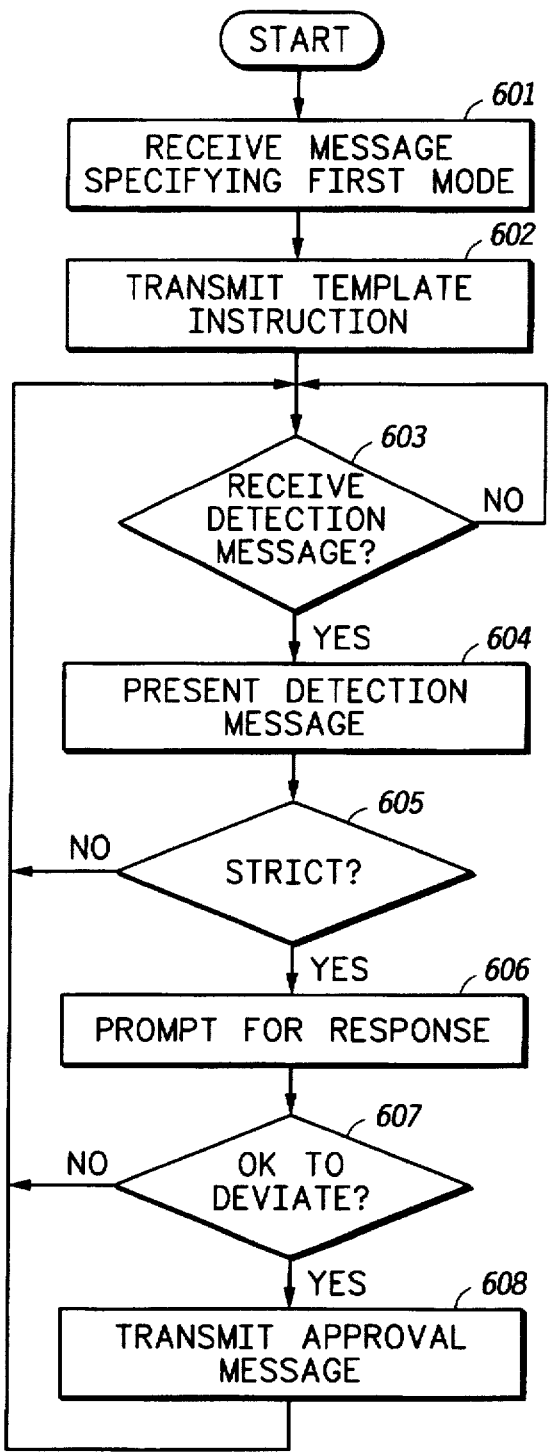
FIG. 6 is a flow chart for use in a supervisor communication unit.

FIG. 6 is a flow chart for use in a supervisor communication unit. At step 601, the supervisor communication unit receives a message indicating a first mode of operation for a communication unit or units. This message is typically entered by a user-interface device, such as a keypad or menu-driven display, on the supervisor communication unit. For example, it a user of the supervisor communication unit wants to restrict a communication unit having communication unit address "65" to operation within a single site, a sequence of commands are entered via the keypad or menu-driven display.

Alternatively, the message could indicate that a previously transmitted template is be "turned-off". For example, a template restricting a communication unit having communication unit address "90" to dispatch service only can be rescinded. In this manner, the communication unit or units can resume unrestricted operation.

At step 602, in response to the message received at step 601, a template instruction specifying the first mode of operation (or allowing all modes of operation) is sent to the communication unit or units. For the purposes of this description, it is assumed that the message received at step 601 is restrictive. As described above, the template instruction restricts operation of the communication unit or units to the first mode. An enforcement level indication and a supervisor address are included in the template instruction.

At step 603, the supervisor communication unit determines if a detection message, as described above, has been received. If a detection message has been received, the contents of the detection message are presented, via a display at step 604, to the user of the supervisor communication unit.

At step 605 the supervisor communication unit determines if the enforcement level is strict, as indicated by the detection message. If the enforcement level is not strict (i.e., monitor enforcement level), the process is started again at step 603. However, if the enforcement level is strict, the supervisor communication unit prompts the user for a response at step 606. This includes presenting a suitable text and audible message to the supervisor through the user-interface, and receiving the response via the user-interface. At step 607, the supervisor communication unit determines, based on the response given by the user, if the communication unit or units can deviate from the first mode of operation. If the communication unit or units cannot deviate, processing continues at step 603. In this manner, the supervisor communication unit essentially denies the request to deviate from the first mode.

If the communication unit or units can deviate from the first mode, the supervisor communication unit transmits an approval message at step 608. The approval message, sent to the communication unit or units, indicates the second mode of operation has been approved. Using the method described above, a supervisor communication unit can provide varying levels of control over a communication unit or units.

Figure 7:
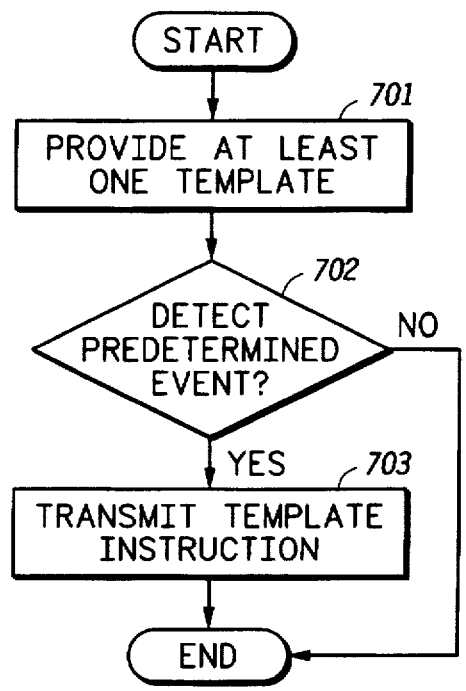
FIG. 7 is a flow chart for use in a communication resource controller.

FIG. 7 is a flow chart for use in a communication resource controller. At step 701, at least one operating mode template is provided. This is achieved, for example, by constructing a table containing at least one operation mode template, each specifying a limited set of operating parameters, like that shown in FIG. 2.

At step 702, the communication resource controller determines if a predetermined event has occurred. A predetermined event, as described above, may comprise detection of a predetermined state of a communication unit, such as recent affiliation of a communication unit, talk group activity within a talk group, occurrence of a predetermined call-type, detection of a present location of one or more communication units, or any other change indicated by transceived messages within a communication system. When a table like that shown in FIG. 2 is used, a predetermined event has occurred when the elements shown in the trigger type, trigger, and source address fields for any one entry are detected in a message.

At step 703, when a predetermined event has been detected, the communication resource controller transmits a template instruction, as described above, to a communication unit or units having the address specified in the target address field corresponding to the predetermined event. The template instruction restricts operation of the communication unit or units to a first mode of operation at a given enforcement level, as described above. Using either method shown and described in FIGS. 6 and 7, a template instruction is used to control the operating mode of a communication unit or units.

The present invention provides a method for controlling operating modes of two-way wireless communication units. A template instruction is used to restrict operation of a communication unit or units to one or more of a particular service, talk group, site, or system. The template instruction also specifies a supervisor communication unit and an enforcement level for the communication unit or units. In this manner, the problems associated with verbal and/or textual instructions regarding operating modes are avoided. Furthermore, the potential for communication unit users to deviate from a first operating mode is reduced according to the level of enforcement used.

We claim:

1. A method comprising steps of:
   in a two-way wireless communication unit:
   receiving a template instruction specifying a first mode of operation that restricts operation of the two-way wireless communication unit to a particular site;
   automatically configuring the two-way wireless communication unit to operate in the first mode of operation; and
   detecting an attempt to operate the two-way wireless communication unit in a second mode of operation, which second mode of operation conflicts with the first mode of operation.

2. The method of claim 1 wherein the step of receiving the template instruction specifying a first mode of operation includes a step of receiving an instruction that restricts operation of the two-way wireless communication unit to a particular talk group.

3. The method of claim 1, further comprising a step of:
   in response to detecting the attempt, effecting a predetermined course of action.

4. The method of claim 3, wherein the step of effecting the predetermined course of action includes a step of maintaining operation of the two-way wireless communication unit in the first mode of operation.

5. The method of claim 4, wherein the step of maintaining operation includes a step of automatically transmitting a detection message indicating detection of the attempt.

6. The method of claim 4, wherein the step of maintaining operation includes a step of automatically storing a detection message indicating detection of the attempt.

7. The method of claim 3, wherein the step of effecting the predetermined course of action includes steps of:
   allowing operation of the two-way wireless communication unit in the second mode of operation; and
   automatically transmitting a detection message indicating detection of the attempt.

8. The method of claim 3, wherein the step of effecting the predetermined course of action includes steps of:
   allowing operation of the two-way wireless communication unit in the second mode of operation; and
   automatically storing a detection message indicating detection of the attempt.

9. The method of claim 3, wherein the step of effecting the predetermined course of action includes a step of providing a local alert to a user of the two-way wireless communication unit.

10. A method comprising steps of:
    in a two-way wireless communication unit:
    receiving a template instruction specifying a first mode of operation;
    automatically configuring the two-way wireless communication unit to operate in the first mode of operation;
    when detecting an attempt to operate the two-way wireless communication unit in a second mode of operation, which second mode of operation conflicts with the first mode of operation:
    when an approval message that indicates that a mode of operation that conflicts with the first mode of operation is approved has been received by the two-way wireless communication unit, allowing operation of the two-way wireless communication unit in the second mode of operation; and when the approval message has not been received by the two-way wireless communication unit, maintaining operation of the two-way wireless communication unit in the first mode of operation.

11. A method comprising steps of:

in a first two-way wireless communication unit: receiving a message specifying a first mode of operation;

automatically transmitting, to a second two-way wireless communication unit that is capable of a plurality of modes of operation, a template instruction specifying the first mode of operation; and detecting an attempt to operate the second two-way wireless communication unit in a second mode of operation, which second mode of operation conflicts with the first mode of operation.

12. The method of claim 11, wherein the step of receiving the message specifying the first mode of operation includes a step of detecting assertion of a user-interface device.

13. The method of claim 11, wherein the step of detecting the attempt to operate the second two-way wireless communication unit in the second mode of operation further comprises receiving a detection message that identifies the second mode of operation from the second two-way wireless communication unit.

14. The method of claim 13, further comprising steps of:

presenting the detection message to a user of the first two-way wireless communication unit;

prompting the user for a response; and transmitting, to the second two-way wireless communication unit, an approval message when the response indicates that the second mode of operation is approved.

15. A method, comprising steps of:

in a two-way wireless communication system:

providing at least one operating mode template that specifies a limited set of operating parameters;

detecting a present location of at least one two-way wireless communication unit; and automatically transmitting a template instruction to the at least one two-way wireless communication unit, wherein the template instruction instructs the at least one two-way wireless communication unit to operate using a particular one of the at least one operating mode template.

16. A method comprising steps of:

in a two-way wireless communication unit:

receiving a template instruction specifying a first mode of operation that restricts operation of the two-way wireless communication unit to a particular wireless communication system;

automatically configuring the two-way wireless communication unit to operate in the first mode of operation; and detecting an attempt to operate the two-way wireless communication unit in a second mode of operation, which second mode of operation conflicts with the first mode of operation.

17. The method of claim 16, wherein the step of receiving the template instruction specifying a first mode of operation includes a step of receiving an instruction that restricts operation of the two-way wireless communication unit to a particular talk group.

18. The method of claim 16, further comprising a step of:

in response to detecting the attempt, effecting a predetermined course of action.

19. The method of claim 18, wherein the step of effecting the predetermined course of action includes a step of maintaining operation of the two-way wireless communication unit in the first mode of operation.

20. The method of claim 19, wherein the step of maintaining operation includes a step of automatically transmitting a detection message indicating detection of the attempt.

21. The method of claim 19, wherein the step of maintaining operation includes a step of automatically storing a detection message indicating detection of the attempt.

22. The method of claim 18, wherein the step of effecting the predetermined course of action includes steps of:

allowing operation of the two-way wireless communication unit in the second mode of operation; and automatically transmitting a detection message indicating detection of the attempt.

23. The method of claim 18, wherein the step of effecting the predetermined course of action includes steps of:

allowing operation of the two-way wireless communication unit in the second mode of operation; and automatically storing a detection message indicating detection of the attempt.

24. The method of claim 18, wherein the step of effecting the predetermined course of action includes a step of providing a local alert to a user of the two-way wireless communication unit.

25. A method comprising steps of:

in a two-way wireless communication unit:

receiving a template instruction specifying a first mode of operation that restricts operation of the two-way wireless communication unit to dispatch services only;

automatically configuring the two-way wireless communication unit to operate in the first mode of operation; and detecting an attempt to operate the two-way wireless communication unit in a second mode of operation, which second mode of operation conflicts with the first mode of operation.

26. The method of claim 25, wherein the step of receiving the template instruction specifying a first mode of operation includes a step of receiving an instruction that restricts operation of the two-way wireless communication unit to a particular talk group.

27. The method of claim 25; further comprising a step of:

in response to detecting the attempt, effecting a predetermined course of action.

28. The method of claim 27, wherein the step of effecting the predetermined course of action includes a step of maintaining operation of the two-way wireless communication unit in the first mode of operation.

29. The method of claim 28, wherein the step of maintaining operation includes a step of automatically transmitting a detection message indicating detection of the attempt.

30. The method of claim 28, wherein the step of maintaining operation includes a step of automatically storing a detection message indicating detection of the attempt.

31. The method of claim 27, wherein the step of effecting the predetermined course of action includes steps of:

allowing operation of the two-way wireless communication unit in the second mode of operation; and automatically transmitting a detection message indicating detection of the attempt.

32. The method of claim 27, wherein the step of effecting the predetermined course of action includes steps of:

allowing operation of the two-way wireless communication unit in the second mode of operation; and automatically storing a detection message indicating detection of the attempt.

33. The method of claim 27, wherein the step of effecting the predetermined course of action includes a step of providing a local alert to a user of the two-way wireless communication unit.

34. A method, comprising steps of:

in a two-way wireless communication system:

providing at least one operating mode template that specifies a limited set of operating parameters;

detecting a present location of a first two-way wireless communication unit; and automatically transmitting a template instruction to at least a second two-way wireless communication unit, wherein the template instruction instructs the at least the second two-way wireless communication unit to operate using a particular one of the at least one operating mode template.

* * * * *